United States Patent [19]
Bratter et al.

[11] 3,887,726

[45] June 3, 1975

[54] METHOD OF CHEMICAL VAPOR DEPOSITION TO PROVIDE SILICON DIOXIDE FILMS WITH REDUCED SURFACE STATE CHARGE ON SEMICONDUCTOR SUBSTRATES

[75] Inventors: Robert L. Bratter, Wappinger Falls; Arun K. Gaind, Fishkill, both of N.Y.

[73] Assignee: International Business Machines Corporation, Armonk, N.Y.

[22] Filed: June 29, 1973

[21] Appl. No.: 375,297

[52] U.S. Cl. .................................................. 427/95
[51] Int. Cl. .................................................. B44d 1/18
[58] Field of Search ............. 117/201, 212, 107.2 R

[56] References Cited

UNITED STATES PATENTS

| | | | |
|---|---|---|---|
| 3,511,702 | 5/1970 | Jackson et al. | 117/212 |
| 3,556,879 | 1/1971 | Mayer | 148/191 |
| 3,692,571 | 9/1972 | Colton | 117/201 |

*Primary Examiner*—John D. Welsh
*Attorney, Agent, or Firm*—J. B. Kraft

[57] ABSTRACT

The present invention relates to an improvement in the conventional method of forming silicon dioxide films by a chemical-vapor deposition reaction of a mixture of an oxidizing agent and $SiH_nCl_{(4-n)}$, where n is an integer of from 0 to 4. Such conventional methods which are conducted at temperatures of at least 700°C provide silicon dioxide films on silicon substrates which are substantially free of mobile ion contamination as evidenced by insignificant flat-band voltage shift when subjected to standard bias-temperature test conditions; such insignificant flat-band voltage shifts are indicative of a maximum increase of $1 \times 10^{11}$ charges/cm$^2$ in the flat-band surface charge resulting from such bias-temperature conditions.

The improved method of the present invention involves adding HCl from an external source to the conventional chemical-vapor deposition reaction mixture. The addition of the HCl provides a silicon dioxide covered silicon substrate, with reduced surface state charges.

9 Claims, 1 Drawing Figure

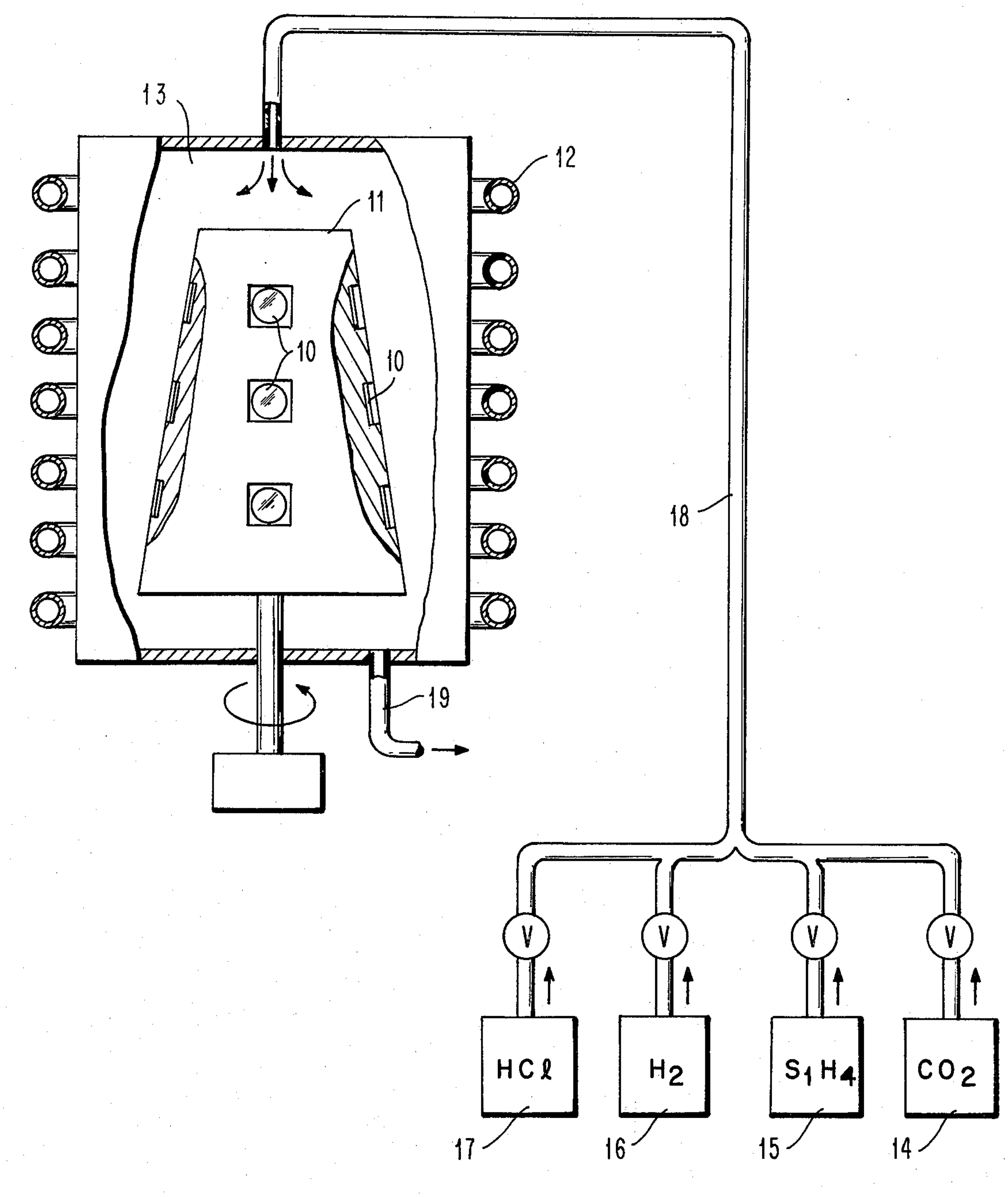
13
12
11
10
10
18
19
V
V
V
V
HCℓ
H2
S1H4
CO2
17
16
15
14

METHOD OF CHEMICAL VAPOR DEPOSITION TO PROVIDE SILICON DIOXIDE FILMS WITH REDUCED SURFACE STATE CHARGE ON SEMICONDUCTOR SUBSTRATES

BACKGROUND OF INVENTION

The present invention relates to methods of forming silicon dioxide films on silicon substrates by chemical-vapor deposition reactions. More particularly, it relates to an improvement in methods for depositing such films which are already "clean," i.e., substantially free of mobile ion, e.g., sodium ion, contamination. Such freedom of sodium ion contamination is manifested by the stability of these silicon dioxide films when subjected to bias-temperature (BT) test conditions. The bias-temperature test which is well known in the art is described in detail in the article "The C-V Techniques as an Analytical Tool," K. H. Zaininger et al., appearing in *Solid State Technology*, May 1970, p.49 (Part 1), and June 1970, p.46 (Part 2), and particularly on pp. 53 and 54 of Part 2 of said article. The stability of the chemical-vapor deposited silicon dioxide films in accordance with said method is evidenced by a shift in the flatband voltage when the oxide layer is subjected to standard bias-temperature test conditions of an applied field of $2 \times 10^6$V/cm for 30 minutes at 250°C, which is so slight that it indicates an increase of $1 \times 10^{11}$ charges/cm$^2$ or less in the surface charge as a result of said bias-temperature test conditions.

A conventional method for depositing such clean chemical-vapor deposited silicon dioxide films on a silicon substrate is described in the article "Pyrolytic Silica on Silicon Deposited from Silane and Carbon Dioxide," R. C. G. Swann and A. E. Pyne, appearing in *The Journal of The Electrochemical Society*, 1969, pp. 1014–1017. In such conventional methods, the silicon dioxide is deposited by a chemical-vapor method from a reaction mixture comprising silane or a silicon chloride source, an oxidizing agent such as carbon dioxide, and a carrier gas such as hydrogen. These silicon dioxide films which were formed at substrate temperatures above 700°C are known in the art to be substantially free of sodium ion contamination as evidenced by an increase of only $1 \times 10^{11}$ charges/cm$^2$ in surface charge when subjected to bake or temperature bias tests as set forth on page 1016 of said article.

Accordingly, it may be said that the prior art chemical-vapor deposition methods for silicon dioxide on silicon have substantially solved the problem of mobile ion contamination by providing a silicon dioxide layer substantially free of sodium ion contamination as evidenced by the stability of the structures under temperature bias stress. However, structures produced by such prior art methods still have a significant flat band surface charge ($N_{fb}$). This remaining surface charge is in the order of $1\text{–}3 \times 10^{11}$ charges/cm$^2$ as indicated in the above-mentioned Swann and Pyne article. Such a charge level in a silicon dioxide-silicon interface in the gate region of most field effect transistors requires relatively high turn-on voltages for the FET's. Such turn-on voltage requirements could be desirably reduced if silicon dioxide-silicon structures of lower flat band surface charge could be produced.

In addition, the surface charge level of silicon dioxide-silicon structures produced by the above-described prior art chemical-vapor deposition methods results in problems in integrated circuit areas where the silicon dioxide insulates the underlying silicon from surface metallization. Such surface charges, in combination with the current-carrying metallization, can result in an inversion in the silicon at the silicon dioxide-silicon interface.

In this connection, it should be noted that the charges associated with a metal silicon dioxide-silicon or MIS structure are understood in the art to be affected by three variable charge components. These include mobile charge or sodium ion contamination which affects the stability and the reproducibility of an MIS structure. Because, as set forth previously, the present prior art methods produce chemical-vapor deposited silicon dioxide films on silicon which are substantially free of sodium ion contamination, the mobile charge component is no longer considered to be a problem in the prior art.

The other two components of charge which are related to the surface states of the silicon dioxide-silicon structure are still considered to present undesirable problems in the art. The first of these two surface state charge components is determined by deviation of the flat band voltage of a conventional C-y characteristic curve from the theoretical value of such a flat band voltage. The flat band voltage, or $V_{fb}$, based upon C-V curve is well known in the art as described, for example, in the text *Physics and Technology of Semiconductor Devices*, A. S. Grove, John Wiley and Sons, Inc., 1967, pp. 279–285. The flat band voltage or deviation from theoretical flat band voltage is directly convertible to the charge at flat hand ($N_{fb}$) by a conversion factor which is approximately $1 \times 10^{11}$ charges/cm$^2$ for each flat band volt using silicon dioxide 2,000A in thickness. The $N_{fb}$ determined in this fashion is normally considered to be a component of the surface charge attributable to the presence of excess ionic silicon in the silicon dioxide at the silicon-silicon dioxide interface. The other component of surface state charge, sometimes known as $N_{ss}$ which may not have a significant effect on the immediate operating characteristics of MIS structures in integrated circuits, appears to have an effect on the reliability in operation of the integrated circuits over a long time basis. In other words, MIS structures mainfesting relatively large $N_{ss}$ factors appear to become unreliable sooner during actual operation. The $N_{ss}$ factor is a fast surface state density based upon low frequency MIS capacitance measurements. These are described in detail in "Surface States at Steam-Grown Silicon-Silicon Dioxide Interfaces," C. N. Berglund, *IEE Transactions on Electron Devices*, Volume ED-13, No. 10, October 1966, pp. 701–705, and "A Quasi-Static Technique for MOS C-V and Surface State Measurements," M. Kuhn, *Solid-State Electronics*, Vol. 13, 1970, pp. 873–885.

SUMMARY OF THE INVENTION

Accordingly, it is a primary object of the present invention to provide an improvement in the method for the chemical-vapor deposition of silicon dioxide on silicon which significantly reduces silica state charges in such structures.

It is a further object of the present invention to provide an improvement in the method of chemical-vapor deposition of silicon dioxide on silicon which significantly reduces that component of surface state charge indicated by $N_{fb}$, charge at flat band voltage.

It is another object of the present invention to provide an improvement in the method of chemical-vapor deposition of substantially mobile ion-free silicon dioxide on silicon to provide a MIS integrated circuit structure of improved reliability over long time operating conditions.

It is yet another object of the present invention to provide an improvement in the method of chemical-vapor deposition of substantially mobile ion-free silicon dioxide on silicon to yield MIS-FET structures requiring reduced turn-on gate voltages.

It is even another object of the present invention to provide an improved method of chemical-vapor deposition of silicon dioxide which is substantially free of unbonded silicon.

It is yet a further object of the present invention to provide an improvement in the method of chemical-vapor deposition of substantially mobile ion-free silicon dioxide layers on silicon to produce MIS structures wherein the tendency for surface inversion to silicon dioxide-silicon interface beneath current-carrying metal is substantially reduced.

The present invention achieves the above objects by adding HCl from an external source to conventional chemical-vapor deposition reactants including an oxidizing agent and $SiH_nCl_{(4-n)}$, *where* $n$ is an integer of from 0 to 4. The HCl is added to such reactants in a method which already produces silicon dioxide on silicon structures which are substantially free of mobile or sodium ion contamination, as evidenced by a maximum increase of $1 \times 10^{11}$ charges/cm$^2$ in surface state charge when such structures are subjected to temperature-bias test condition of applied field of $2 \times 10^6$V/cm for 30 minutes at 250°C.

As will be set forth in greater detail in the description of the embodiment of this invention, the addition of HCl reduces the $N_{fb}$ about one order of magnitude thereby providing a marked reduction in gate turn-on voltage requirements for silicon-silicon dioxide FET's as well as a significant reduction in the possibility of silicon-silicon dioxide interface inversion in MIS integrated circuit structures in general. In addition, a significant reduction in the $N_{ss}$ component appears to result from the addition of HCl. This appears to be reflected in the increased reliability of the produced MIS structures under long term operating conditions accelerated in time.

The foregoing and other objects, features and advantages of the invention will be apparent from the following more particular description and preferred embodiment of the invention as illustrated in the accompanying drawing.

BRIEF DESCRIPTION OF THE DRAWING

The FIGURE is a diagrammatic view of conventional apparatus which may be used in the practice of the present invention.

DESCRIPTION OF PREFERRED EMBODIMENT

Utilizing conventional induction heated chemical-vapor deposition apparatus, such as that described in the aforementioned Swann and Pyne article, for the chemical-vapor deposition of silicon dioxide on silicon, or more conveniently, apparatus as shown in the FIGURE which can handle a plurality of wafers at a time, a plurality of silicon wafers 10 are loaded in rotating susceptor 11 which is induction heated through coils 12. The wafers are 2¼ inch polished silicon wafers. Silicon wafers 10 are N-arsenic doped 8 to 10 ohm-centimeters, <100 > orientated wafers. The induction heating apparatus shown may conveniently be the deposition apparatus described in U.S. Pat. No. 3,424,629, E. O. Ernst et al., modified so that the feed through chamber 13 runs downward. Carbon dioxide from source 14 fed at the rate of 1.2 liters/minute, a 5 percent, by volume, silane in hydrogen composition from source 15, fed at the rate of 60 cc's/minute, hydrogen from source 16, fed at the rate of 105 liters/minute, and HCl from source 17 at the rate of 100 cc's/minute are continuously mixed in conduit 18 and fed into chamber 13, with the reaction gaseous products continuously passing out through conduit 19. The proportion of HCl in the total reaction mixture is 0.1 mole percent. However, up to 3.0 mole percent of HCl can be effectively used in the practice of the present invention. Silicon dioxide is deposited onto silicon wafers 10 at the rate of 45A a minute at a deposition temperature of 1,000°C for about 10 minutes to produce a silicon dioxide layer approximately 450A in thickness.

In order to provide control wafers for comparative testing purposes made in accordance with prior art practices, the above-described procedure is repeated utilizing the same conditions, proportions and ingredients except that no HCl is introduced from source 17.

After the deposition of silicon dioxide is completed, both the original wafers and the control wafers are subjected to a conventional chemical-vapor deposition postanneal step which involves heating to 1050°C for 15 minutes in a nitrogen atmosphere.

The properties of the silicon dioxide on silicon structure produced by the HCl method of the present invention compare with a control structure produced without HCl as follows. The control structure has a flat band voltage $V_{fb}$ of from 0.3 to 0.7V, while the structure produced by the present method has a flat band voltage of less than 0.05V; when this flat band voltage is translated into $N_{fb}$, flat band charge, the control structure has a flat band charge of from 2 to $5 \times 10^{11}$ charges/cm$^2$, while the structure produced by the present invention has a flat band charge of from 1 to $3 \times 10^{10}$ charges/cm$^2$. As a result of this reduction in flat band charge, EET integrated circuits utilizing silicon dioxide on silicon produced in accordance with the present method in gate regions will have significantly lower gate turn-on times. In addition, the possibility of inversion of the silicon dioxide-silicon interface under current-carrying metallization in MIS integrated circuit structures is substantially reduced.

The control structure has a $N_{ss}$ of 0.5 to $1 \times 10^{11}$, while the structure produced by the present method has a $N_{ss}$ of less than $10^{10}$. The present structure thus has a reduction of at least one order of magnitude in $N_{ss}$ which is a surface state charge component believed to be due to unsatisfied or dangling silicon bonds at the silicon-silicon dioxide interface. The $N_{ss}$ characteristic is described in the previously mentioned C. N. Berglund article and the M. Kuhn article.

Probably, as a result of this marked reduction in the $N_{ss}$ characteristic, the structures produced by the present invention display a longer time to device failure due to dielectric breakdown than does the control structure when utilized in similar gates. For example, in order to simulate the operating environment at an accelerated rate, a group of silicon dioxide-silicon structures produced by the present method, and an equivalent group of control structures produced by the conventional method were each subjected to accelerated stress conditions of $4 \times 10^6$ volts/cm at 250°C for a prolonged period of hours. Fifty percent of the control structures had dielectric breakdown in less than 90 hours, while it was over 900 hours before 50 percent of the structures made in accordance with the present invention failed.

The silicon dioxide layers deposited in accordance with the present invention display a slightly higher dielectric breakdown voltage; but more significantly, the breakdown voltage is more consistent than that of the conventionally produced layers on the control wafer.

The present structures display an average dielectric breakdown voltage of $8.9 \times 10^6$V/cm with 99 percent of the samples tested breaking down within 10 percent deviation of this value, while the control structures display an average dielectric breakdown of $8.0 \times 10^6$ with a wider deviation wherein 99 percent of the samples tested break down within a 32 percent deviation of this value.

The silicon dioxide layer produced by the present invention had a lower index of refraction, approximately 1.45, than did the layer in the control structure which had an index of refraction of about 1.46. We believe that this difference indicates a substantial reduction in the amount of free silicon in the present silicon dioxide layer.

Both the control structures and the structures produced by the present method appear to be substantially free of mobile ion contamination as evidenced by the stability of both types of structure under temperature-bias test conditions when subjected to standard temperature-bias test conditions, both structures exhibited a change in surface charge which was less than $1 \times 10^{11}$ charges/cm$^2$ from the basic flat band charge; control structure exhibits the change of about $5 \times 10^{10}$, while the structure made by the present method exhibits the change of about $1 \times 10^{10}$.

While the invention has been particularly shown and described with reference to preferred embodiment thereof, it will be understood by those skilled in the art that the foregoing and other changes in form and details may be made therein without departing from the spirit and scope of the invention.

what is claimed is:

1. In the method of forming silicon dioxide films on silicon substrates by a chemical-vapor deposition reaction of a mixture of an oxidizing agent and $SiH_nCl_{(4-n)}$, where $n$ is an integer of from 0 to 4, to deposit silicon dioxide films displaying a maximum increase of $1 \times 10^{11}$ charges/cm$^2$ in surface charge when subjected to bias-temperature test conditions of applied field of $2 \times 10^6$ V/cm for 30 minutes at 250°C, the improvement of adding HCl from an external source to said reactants.

2. The method of claim 1 wherein said reaction mixture includes a carrier gas.

3. The method of claim 2 wherein the HCl represents from 0.1 to 3.0 mole-percent of the reaction mixture.

4. The method of claim 3 wherein said $SiH_nCl_{(4-n)}$ reactant is silane.

5. The method of claim 4 wherein said oxidizing agent is $CO_2$.

6. The method of claim 5 wherein said carrier gas is $H_2$.

7. The method of claim 6 wherein said silicon dioxide film is formed over an integrated circuit silicon substrate.

8. The method of claim 4 wherein said chemical-vapor deposition reaction involves heating the film to a temperature of at least 700°C, during or after deposition.

9. The method of claim 7 wherein said chemical-vapor deposition reaction involves heating the film to a temperature of at least 700°C, during or after deposition.

* * * * *